US010489336B2

(12) United States Patent
Park

(10) Patent No.: US 10,489,336 B2
(45) Date of Patent: Nov. 26, 2019

(54) STORAGE DEVICE, DATA PROCESSING SYSTEM, AND METHOD FOR OPERATING THE STORAGE DEVICE

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 13 days.

(21) Appl. No.: 15/709,895

(22) Filed: Sep. 20, 2017

(65) Prior Publication Data

US 2018/0253394 A1 Sep. 6, 2018

(30) Foreign Application Priority Data

Mar. 6, 2017 (KR) ........................ 10-2017-0028111

(51) Int. Cl.
*G06F 12/00* (2006.01)
*G06F 13/42* (2006.01)
*G06F 9/4401* (2018.01)
*G06F 3/06* (2006.01)

(52) U.S. Cl.
CPC ........ *G06F 13/4234* (2013.01); *G06F 3/0625* (2013.01); *G06F 9/4401* (2013.01); *G06F 12/00* (2013.01)

(58) Field of Classification Search
CPC ....................................................... G06F 12/00
USPC ......................................................... 711/154
See application file for complete search history.

(56) References Cited

U.S. PATENT DOCUMENTS

| 9,697,065 B1* | 7/2017 | Abhishek ............ G06F 11/0757 |
| 2006/0062070 A1* | 3/2006 | Sibigtroth .............. G11C 5/145 365/226 |
| 2011/0041005 A1* | 2/2011 | Selinger .................. G06F 11/10 714/719 |
| 2013/0013882 A1* | 1/2013 | Fujimoto ............... G11C 5/143 711/170 |
| 2013/0198415 A1* | 8/2013 | Abe ...................... G06F 13/385 710/5 |
| 2017/0040057 A1* | 2/2017 | Cho ........................ G06F 13/16 |

FOREIGN PATENT DOCUMENTS

KR 101476112 12/2014

* cited by examiner

*Primary Examiner* — Gautam Sain
(74) *Attorney, Agent, or Firm* — IP & T Group LLP

(57) ABSTRACT

A storage device may include: a protocol processing unit suitable for communicating with a host based on a predetermined protocol, and transferring a response signal to at least one status request signal that is received from the host; a power management unit suitable for supplying a power source voltage, and outputting a detection signal which represents a low voltage detection status where the power source voltage has a voltage level lower than a predetermined voltage level; and a core unit suitable for blocking a transfer of the response signal by the protocol processing unit in response to the detection signal, and processing at least one task request which is received from the host through the protocol processing unit after the blocking.

17 Claims, 12 Drawing Sheets

STORAGE DEVICE, DATA PROCESSING SYSTEM, AND METHOD FOR OPERATING THE STORAGE DEVICE

CROSS-REFERENCE TO RELATED APPLICATIONS

The present application claims priority of Korean Patent Application No. 10-2017-0028111, filed on Mar. 6, 2017, which is incorporated herein by reference in its entirety.

BACKGROUND

1. Field

Various embodiments of the present disclosure relate to a storage device, a data processing system, and a method for operating the storage device.

2. Description of the Related Art

Recently, the paradigm of the computer environment is changed into a ubiquitous computing environment which allows users to get an access to a computer system anywhere anytime. For this reason, the use of portable electronic devices, such as mobile phones, digital cameras, laptop computers and the like, is surging. The portable electronic devices generally employ a memory system using a memory device for storing data. A memory system may be used as a main memory device or an auxiliary memory device of a portable electronic device.

A memory device has excellent stability and durability because it does not include a mechanical driving unit. Also, the memory device is advantageous in that it may access data quickly and consume a small amount of power. Non-limiting examples of a memory device having these advantages include a universal serial bus (USB) memory device, a memory card with diverse interfaces, and a solid-state drive (SSD).

SUMMARY

Embodiments of the present disclosure are directed to a storage device capable of recovering tasks that are not processed at a low voltage status, a data processing system, and a method for operating the storage device.

In accordance with an embodiment of the present invention, a storage device may include: a protocol processing unit suitable for communicating with a host based on a predetermined protocol, and transferring a response signal to at least one status request signal that is received from the host; a power management unit suitable for supplying a power source voltage, and outputting a detection signal which represents a low voltage detection status where the power source voltage has a voltage level lower than a predetermined voltage level; and a core unit suitable for blocking a transfer of the response signal by the protocol processing unit in response to the detection signal, and processing at least one task request which is received from the host through the protocol processing unit after the blocking.

The core unit may block the transfer of the response signal by the protocol processing unit by resetting the protocol processing unit in response to the detection signal.

The core unit may perform a booting operation in response to a reset signal that is received from the host, after a predetermined time passes from a moment when the transfer of the response signal by the protocol processing unit is blocked.

When the power source voltage is detected to be at a normal level after the booting operation is performed, the core unit may release the blocking on the protocol processing unit.

The core unit may receive the at least one task request through the protocol processing unit after the blocking is released and processes the received task request.

The protocol processing unit may transition to a blocking state where the transfer of the response signal is blocked in the low voltage detection status, transition to an initialization state in response to the reset signal that is received from the host after a predetermined time passes in the blocking state, transition to a busy state where a booting operation is performed in response to the reset signal that is received from the host in the initialization state, and when the power source voltage is detected to be at a normal voltage level in the busy state, transition to an idle state.

The protocol processing unit may transfer the response signal representing the idle state to the host as a response signal to the status request signal that is received from the host in the idle state, and receive the at least one task request from the host after the transfer of the response signal.

In accordance with another embodiment of the present invention, a data processing system may include: a host; and a storage device suitable for blocking a transfer of a response signal to at least one status request signal that is received from the host in a low voltage detection status, and processing at least one task request that is received from the host after the blocking.

The storage device may include: a protocol processing unit suitable for communicating with the host based on a predetermined protocol, and transferring a response signal to the at least one status request signal that is received from the host; a power management unit suitable for supplying a power source voltage, and outputting a detection signal which represents a low voltage detection status where the power source voltage has a voltage level lower than a predetermined voltage level; and a core unit suitable for blocking the transfer of the response signal by the protocol processing unit in response to the detection signal, and processing at least one task request which is received from the host through the protocol processing unit after the blocking.

The core unit may block the transfer of the response signal by the protocol processing unit by resetting the protocol processing unit in response to the detection signal.

The core unit may perform a booting operation in response to a reset signal that is received from the host, after a predetermined time passes from a moment when the transfer of the response signal by the protocol processing unit is blocked.

When the power source voltage is detected to be at a normal level after the booting operation is performed, the core unit may release the blocking on the protocol processing unit.

The core unit may receive the at least one task request through the protocol processing unit after the blocking is released and processes the received task request.

The protocol processing unit may transition to a blocking state where the transfer of the response signal is blocked in the low voltage detection status, transition to an initialization state in response to the reset signal that is received from the host after a predetermined time passes in the blocking state, transition to a busy status where a booting operation is performed in response to the reset signal that is received from the host in the initialization state, when the power source voltage is detected to be at a normal voltage level in the busy state, transition to an idle state, transfer the response signal representing the idle state to the host as a response signal to the status request signal that is received from the host in the idle state, and receive the at least one task request from the host after the transfer of the response signal.

In accordance with yet another embodiment of the present invention, a method for operating a storage device may include: transferring a response signal to at least one status request signal that is received from a host; blocking a transfer of the response signal in a low voltage detection status where a power source voltage has a voltage level lower than a predetermined voltage level; and processing at least one task request that is received from the host after the blocking.

The blocking of the transfer of the response signal in the low voltage detection status may include: blocking of the transfer of the response signal by a protocol processing unit by resetting the protocol processing unit which transfers the response signal to the host in the low voltage detection status.

The method may further include: performing a booting operation in response to a reset signal that is received from the host, after a predetermined time passes from a moment when the transfer of the response signal is blocked.

The method may further include: releasing the blocking, when the power source voltage is detected to be at a normal voltage level, after the booting operation is performed.

The processing of the at least one task request that is received from the host after the blocking may include: receiving the at least one task request from the host after the blocking is released and processing the received task request.

The method may further include: transitioning to a blocking state where the transfer of the response signal is blocked in the low voltage detection status; transitioning to an initialization state in response to the reset signal that is received from the host after a predetermined time passes in the blocking state; transitioning to a busy state where a booting operation is performed in response to the reset signal that is received from the host in the initialization state; when the power source voltage is detected to be at a normal voltage level in the busy state, transitioning to an idle state; transferring the response signal representing the idle state to the host as a response signal to a status request signal that is received from the host in the idle state; and receiving the at least one task request from the host after the transfer of the response signal.

BRIEF DESCRIPTION OF THE DRAWINGS

The above and other features and advantages of the present invention will become more apparent to those skilled in the art to which the present invention pertains by the following detailed description with reference to the attached drawings in which.

DETAILED DESCRIPTION

Figure 1:
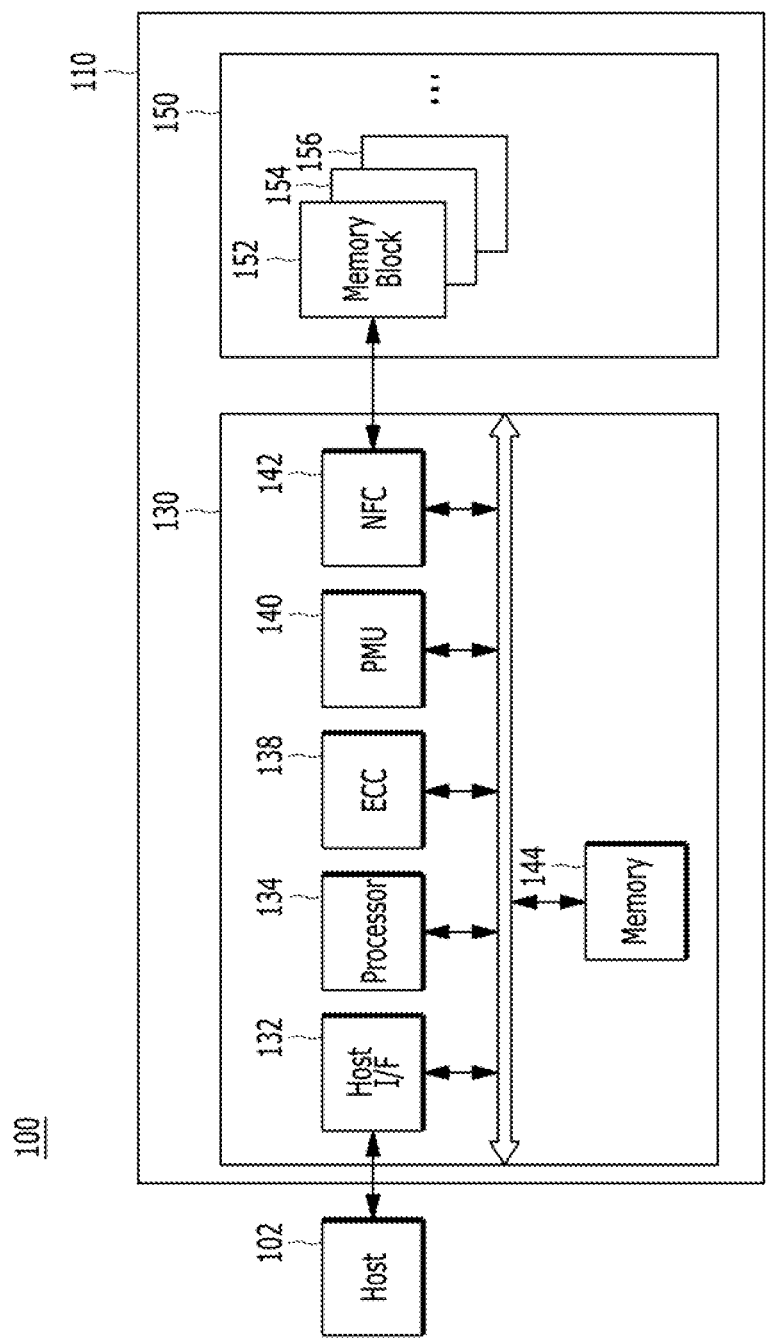
FIG. 1 is a block diagram illustrating a data processing system including a memory system in accordance with an embodiment of the present disclosure.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereinafter, the various embodiments of the present invention will be described in detail with reference to the attached drawings.

FIG. 1 is a block diagram illustrating a data processing system 100 including a memory system 110 in accordance with an embodiment of the present disclosure.

Referring to FIG. 1, the data processing system 100 may include a host 102 operatively coupled to the memory system 110.

The host 102 may be any suitable electronic device including portable electronic devices such as a mobile phone, MP3 player and laptop computer or non-portable electronic devices such as a desktop computer, game machine, TV and projector.

The host 102 may include at least one operating system (OS), and the OS may manage and control the overall functions and operations of the host 102, and also provide an operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. The host 102 may include one or more of Oss. The host 102 may execute an OS to perform an operation corresponding to a user's request on the memory system 110.

The memory system 110 may operate to store data for the host 102 in response to a request of the host 102. Non-limited examples of the memory system 110 may include a solid state drive (SSD), a multi-media card (MMC), a secure digital (SD) card, universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by various types of storage devices. Non-limited examples of storage devices included in the memory system 110 may include volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in the various types of memory systems as exemplified above.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156, each of the memory blocks 152 to 156 may include a plurality of pages, and each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) unit 132, a processor 134, an error correction code (ECC) unit 138, a Power Management Unit (PMU) 140, a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-e), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The NFC 142 may serve as a memory/storage interface for interfacing the controller 130 and the memory device 150 when the memory device is a NAND flash memory, such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150. Other memory/storage interfaces may be used when a different type memory device is employed.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
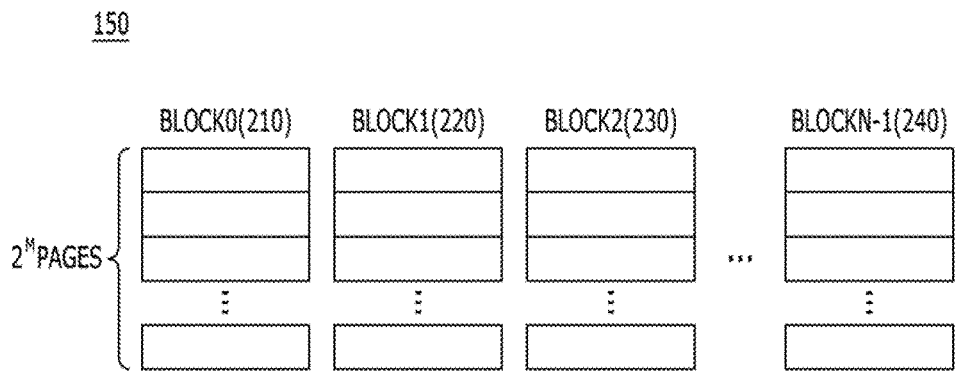
FIG. 2 is a schematic diagram illustrating an exemplary configuration of a memory device employed in the memory system shown in FIG. 1.

FIG. 2 is a schematic diagram illustrating an exemplary configuration of the memory device 150 employed in the memory system 110 show in FIG. 1.

Referring to FIG. 2, the memory device 150 may include a plurality of memory blocks 0 to N−1, and each of the blocks 0 to N−1 may include a plurality of pages, for example, $2^M$ pages, the number of which may vary according to circuit design. Memory cells included in the respective memory blocks 0 to N−1 may be one or more of a single level cell (SLC) storing 1-bit data, a multi-level cell (MLC) storing 2-bit data, an MLC storing 3-bit data also referred to as a triple level cell (TLC), an MLC storing 4-bit data also referred to as a quadruple level cell (QLC), or an MLC storing 5-bit or more bit data.

Figure 3:
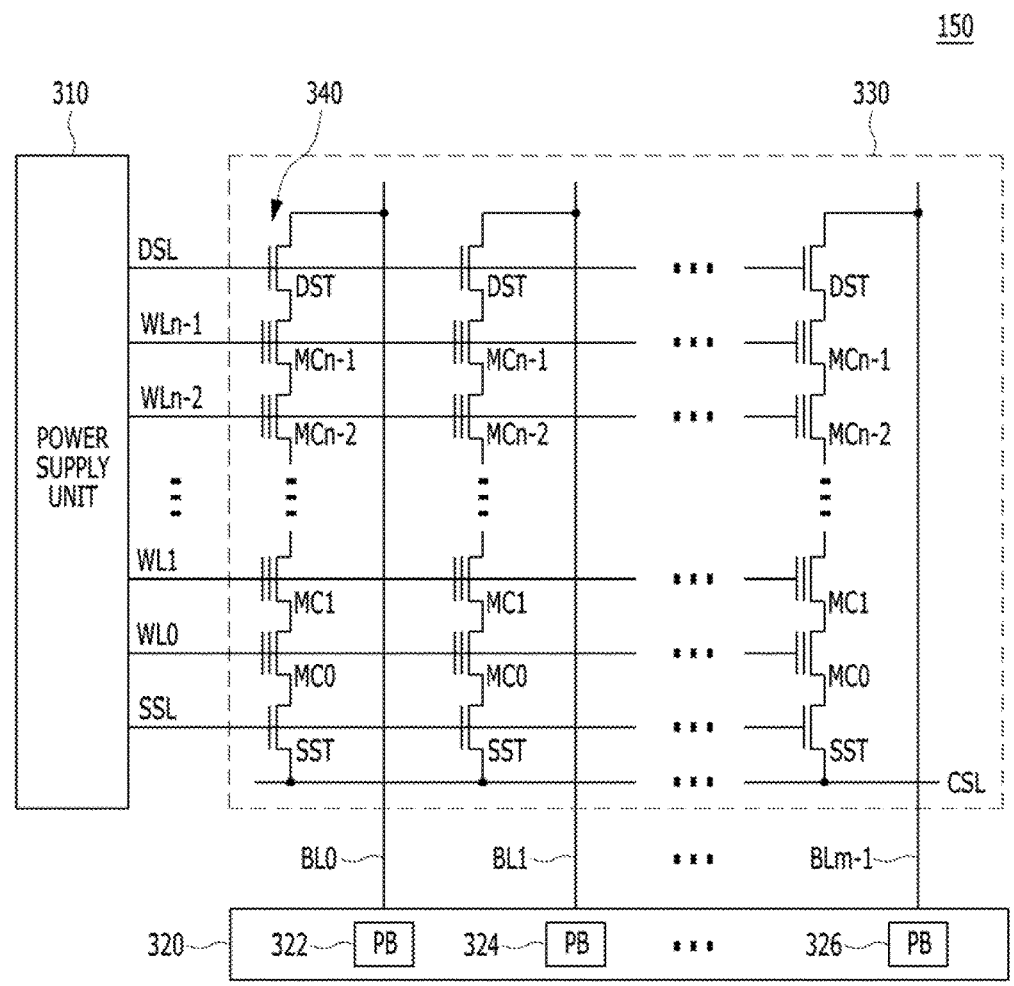
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150 shown in FIG. 2.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. For example, it is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
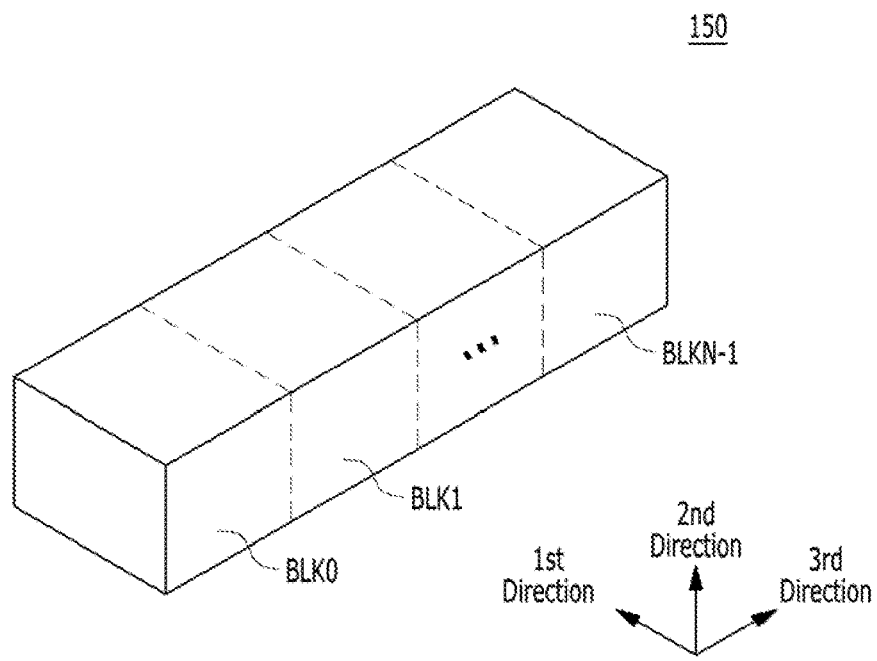
FIG. 4 is a schematic diagram illustrating an exemplary three-dimensional structure of the memory device shown in FIG. 2.

FIG. 4 is a schematic diagram illustrating an exemplary three-dimensional (3D) structure of the memory device 150 shown in FIG. 2.

The memory device 150 may be embodied by a two-dimensional (2D) or three-dimensional (3D) memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

As described above, the memory system 110 shown in FIG. 1 may be a storage device for a mobile device, such as an embedded Multi-Media Card (eMMC), Universal Flash Storage (UFS) and the like. The storage device may be supplied with a particular power source voltage (e.g., approximately 3.3V or 3V). When the power source voltage is equal to or lower than a particular voltage (e.g., approximately 1.65V or 1.5V), the storage device may perform an abnormal operation. For example, in case of low voltage detection (LVD), the storage device may not perform a task that is requested by a host normally.

Generally, the storage device may perform a recovery operation proactively in the low voltage detection (LVD) status. For the recovery operation, the storage device may go through complicated procedures. For example, the storage device may have to store information on tasks (e.g., current index and confirm index), and after reset, the storage device may recover tasks by using the stored information on tasks and checking overlapping tasks while a stable voltage is supplied. The recovery operation may not only increase operation complexity and production cost in the storage device, but also the recovery operation may not be performed at a perfect level. Therefore, it is required to develop a new recovery operation that may be performed more simply and more safely at a low cost when a storage device is in the status of the low voltage detection (LVD).

Figure 5:
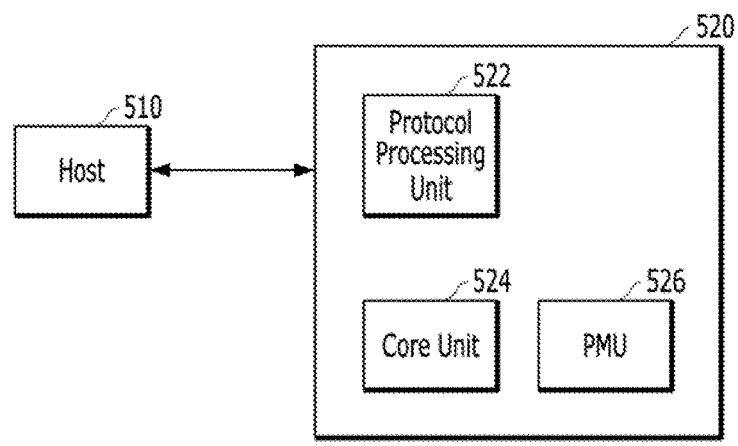
FIG. 5 is a block diagram illustrating a data processing system including a storage device in accordance with an embodiment of the present disclosure.

FIG. 5 is a block diagram illustrating a data processing system including a storage device in accordance with an embodiment of the present disclosure.

Referring to FIG. 5, the data processing system may include a host 510 and a storage device 520. The storage device 520 may include a protocol processing unit 522, a core unit 524, and a power management unit (PMU) 526. The storage device 520 may be a storage device for a mobile device, such as an embedded Multi-Media Card (eMMC), Universal Flash Storage (UFS) and the like, but the storage device 520 may not be limited to it. The structure illustrated in FIG. 5 only shows an example where an operation for recovering a task requested by the host 510 is performed while the storage device 520 is in the low voltage detection (LVD) status. Although not described herein, those skilled in the art should understand that the storage device 520 includes a constituent element for storing data, e.g., the memory device 150 shown in FIG. 1.

The protocol processing unit 522 may communicate with the host 510 based on a predetermined protocol. According to various embodiments of the present disclosure, the storage device 520 may communicate with the host 510 based on a protocol under the Joint Electron Device Engineering Council (JEDEC) Specification. For example, when the storage device 520 is an embedded Multi-Media Card (eMMC), the protocol processing unit 522 may support a protocol for the eMMC. According to another example, when the storage device 520 is a Universal Flash Storage (UFS), the protocol processing unit 522 may support a protocol for the UFS. The protocol processing unit 522 may periodically receive a status request signal from the host 510, and transfer a response signal corresponding to the received status request signal. For example, the operation of receiving the status request signal and the operation of transferring the response signal may be performed within few microseconds (µs).

The power management unit 526 may supply a power source voltage to the storage device 520. When it is detected that a power source voltage is supplied that is lower than a predetermined level, the power management unit 526 may output a detection signal representing the low voltage detection (LVD) status. For example, the power management unit 526 may supply a power source voltage of approximately 3.3V or 3V, and when the power source voltage is equal to or lower than a particular voltage (e.g., approximately 1.65V or 1.5V), the power management unit 526 may output the low voltage detection (LVD) signal indicating the low voltage detection (LVD) status. The core unit 524 may control various operations of the storage device 520. The core unit 524 may perform an operation corresponding to the processor 134 and/or the NFC 142 that are shown in FIG. 1. Herein, the core unit 524 is described as an example of performing operations that are related to the embodiments of the present disclosure. The core unit 524 may decide that the power source voltage is in the low voltage detection (LVD) status in response to the detection signal received from the power management unit 526.

The core unit 524 may be block the transfer of the detection signal by the protocol processing unit 522 in response to the detection signal. According to various embodiments of the present disclosure, the core unit 524 may block the transfer of the response signal by the protocol processing unit 522 by resetting (i.e., self-resetting) the protocol processing unit 522 in response to the detection signal.

The core unit 524 may perform a booting operation in response to a reset signal that is received from the host 510 after a predetermined time passes from a moment when the transfer of the response signal is blocked by the protocol processing unit 522. When the protocol processing unit 522 is reset, most commands or signals may not be received from the host 510, but the reset signal or commands (e.g., CMD 0 and CMD 1) corresponding to the reset signal may be received.

When the power source voltage is detected at a stable level after the booting operation is performed, the core unit 524 may release the blocking of the protocol processing unit 522. After the blocking is released, the core unit 524 may receive at least one task (or command) request (e.g., read, write, and erase) from the host 510 through the protocol processing unit 522, and process the received task request. Herein, the received task request may not be processed because the storage device 520 is in the low voltage detection (LVD) status. The core unit 524 then may recover the un-processed task request by receiving the task request that is not processed and processing it.

To be specific, when a power source voltage is supplied at a normal voltage level, the storage device 520 may perform an operation corresponding to the task request that is received from the host 510 so as to produce an operation performance result, and transfer a response signal corresponding to the operation performance result to the host 510. However, being in the low voltage detection (LVD) status, the storage device 520 may not normally perform an operation according to the task request that is received from the host 510, or even if the storage device 520 normally performs an operation according to the task request that is received from the host 510, the storage device 520 may not transfer the response signal corresponding to the operation performance result to the host 510. The host 510 may detect at least one task request to which a response signal is not received among the task requests that are transferred to the storage device 520, which is an un-processed task request, and transfer the un-processed task request back to the storage device 520. The storage device 520 may perform an operation corresponding to the un-processed task request, and transfer a response signal corresponding to the operation performance result to the host 510. In this way, the un-processed task request may be recovered.

Figure 6:
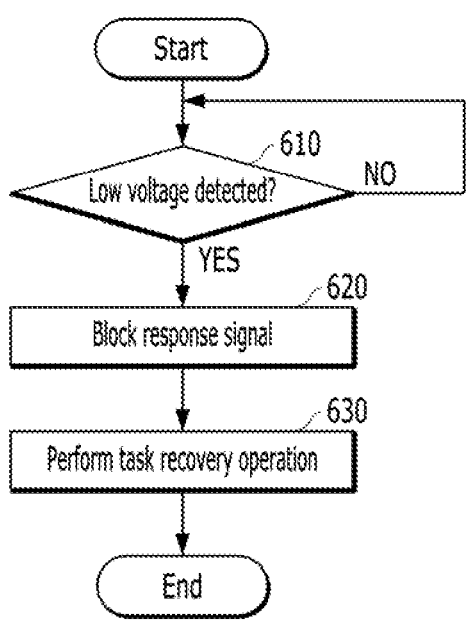
FIG. 6 is a flowchart illustrating an operation of a storage device in accordance with an embodiment of the present disclosure.

FIG. 6 is a flowchart illustrating an operation of a storage device in accordance with an embodiment of the present disclosure. The operation may be performed by the storage device 520 illustrated in FIG. 5.

Referring to FIG. 6, in step 610, the storage device 520 may decide whether a power source voltage is supplied at a voltage level lower than a predetermined voltage level. In other words, the storage device 520 may decide whether it is in the low voltage detection (LVD) status or not. When the storage device 520 is in the low voltage detection (LVD) status, in step 620, the storage device 520 may block the transfer of a response signal to at least one status request signal that is received from the host 510. In step 630, the storage device 520 may perform a task recovery operation by processing at least a task request that is received from the host 510 after the blocking.

Figure 7:
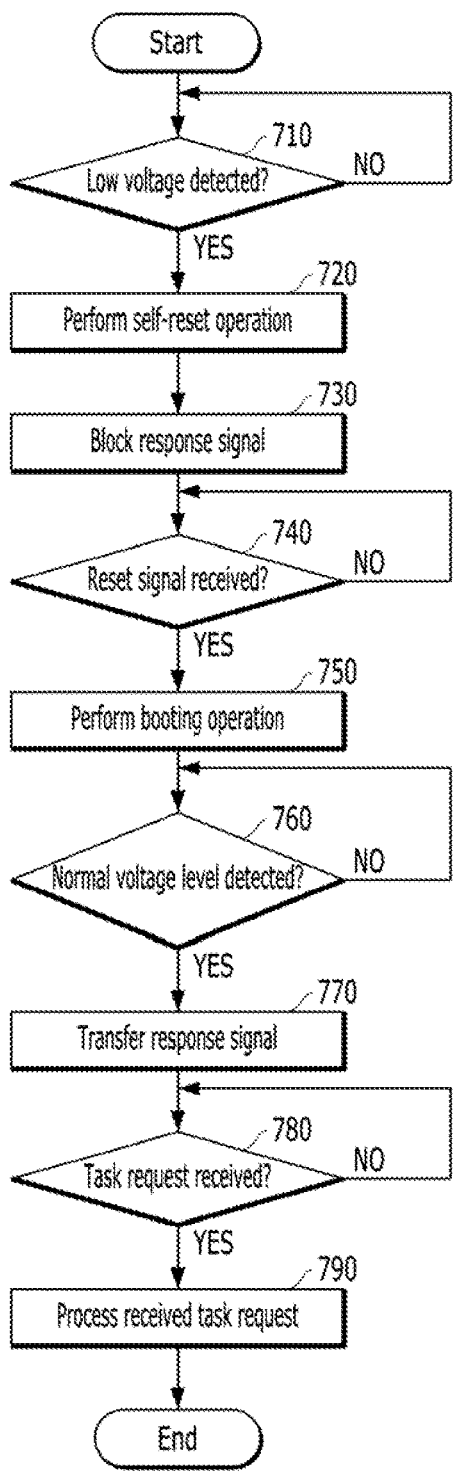
FIG. 7 is a flowchart illustrating an operation of a storage device in accordance with another embodiment of the present disclosure.

FIG. 7 is a flowchart illustrating an operation of a storage device in accordance with another embodiment of the present disclosure. The operation may be performed by the core unit 524 of the storage device 520 illustrated in FIG. 5.

Referring to FIG. 7, in step 710, the core unit 524 of the storage device 520 may decide whether a power source voltage is supplied at a voltage level lower than a predetermined voltage level. The core unit 524 may be able to decide whether a power source voltage is in the low voltage detection (LVD) status in response to an LVD detection signal that is received from the power management unit 526.

In case of the low voltage detection (LVD) status, the storage device 520 may perform a self-reset operation in step 720. In short, the core unit 524 may reset the protocol processing unit 522 in step 720. In step 720, the protocol processing unit 522 may block the transfer of a response signal to the status request signal that is received from the host 510 in response to the reset of the protocol processing unit 522, which is performed by the core unit 524.

When a response signal to the status request signal is not received until a predetermined time (e.g., several µs) passes, the host 510 may detect that the storage device 520 is in the low voltage detection (LVD) status and transfer a reset signal RESET for a booting operation of the storage device 520 to the storage device 520. In accordance with the embodiment of the present disclosure, when the storage device 520 is an embedded Multi-Media Card (eMMC), the host 510 may transfer a command CMD for reset, which may be a '0', or a command CMD for initialization, which may be a '1', to the storage device 520 as a reset signal RESET.

In step 740, the core unit 524 may decide whether a reset signal is received from the host 510 after passing of a predetermined time from the moment when the transfer of the response signal is blocked. When a reset signal is received from the host 510 after passing of a predetermined time from the moment when the transfer of the response signal is blocked, the core unit 524 may perform a booting operation in response to the received reset signal in step 750.

In step 760, the core unit 524 may decide whether the power source voltage is at a normal voltage level after performing of the booting operation. When it is decided that the power source voltage is at the normal voltage level, the core unit 524 may control the protocol processing unit 522 to transfer a response signal to the status request signal that is received from the host 510 by releasing the blocking of the protocol processing unit 522 in step 770. Herein, since it is decided that the power source voltage is at the normal voltage level, the response signal may include an idle state value representing that the protocol processing unit 522 transitions a state of the storage device 520 to an idle state.

In step 780, the core unit 524 may decide whether at least one task request is received from the host 510 through the protocol processing unit 522 after the blocking is released. When it is decided that at least one task request is received, the core unit 524 may process the task request received through the protocol processing unit 522 in step 780. In this way, the core unit 524 may recover an un-processed task request by receiving and processing a task request which has not been processed before.

Figure 8:
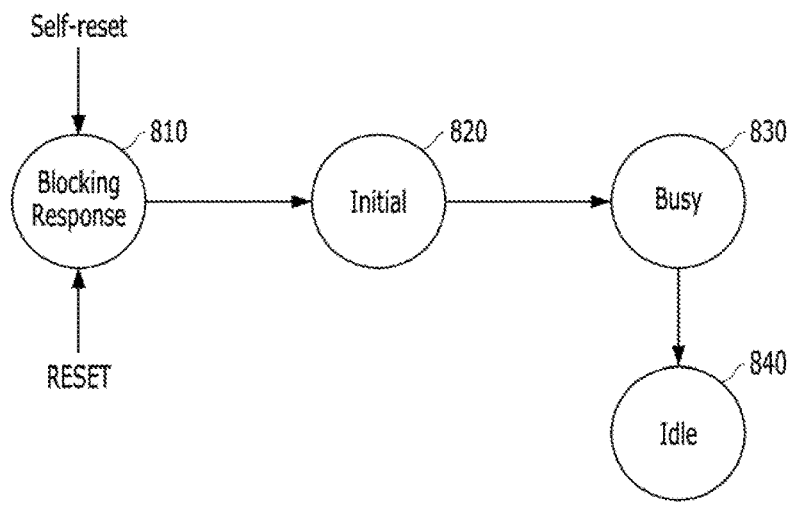
FIG. 8 illustrates a state transition of a protocol processing unit in accordance with an embodiment of the present disclosure.

FIG. 8 illustrates a state transition of a protocol processing unit in accordance with an embodiment of the present disclosure. The state transition may be performed by the protocol processing unit 522 illustrated in FIG. 5.

Referring to FIG. 8, the protocol processing unit 522 may transition a state of the storage device 520 to a response blocking state 810. In the response blocking state 810, the transfer of the response signal to the status request signal received from the host 510 is blocked in response to a self-request signal according to the LVD status that is transferred from the core unit 524.

The protocol processing unit 522 may transition the state of the storage device 520 to an initial state 820 in response to the reset signal RESET that is received from the host 510 after a predetermined time passes in the response blocking state 810, or a busy state 830 where a booting operation is performed.

When it is decided that the power source voltage is at a normal voltage level in the busy state 830, the protocol processing unit 522 may transition the state of the storage device 520 to an idle state 840. In the idle state 840, the protocol processing unit 522 may transfer a response signal representing the idle state to the host 510 in response to the status request signal that is received from the host 510.

Figure 9:
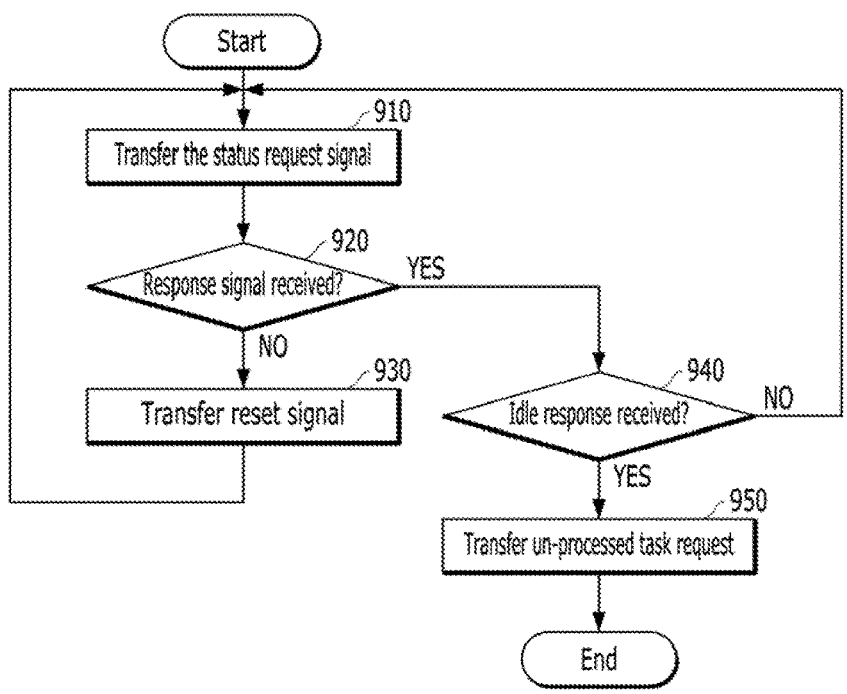
FIG. 9 is a flowchart illustrating an operation of a host in accordance with an embodiment of the present disclosure.

FIG. 9 is a flowchart illustrating an operation of a host in accordance with an embodiment of the present disclosure. The operation may be performed by the host 510 illustrated in FIG. 5.

Referring to FIG. 9, the host 510 may transfer the status request signal to the storage device 520 in step 910. In step 920, the host 510 may decide whether the response signal to the status request signal is received or not. When the response signal to the status request signal is not received until a predetermined time (e.g., several µs) passes, the host 510 may recognize that the storage device 520 is in the low voltage detection (LVD) status, and transfer the reset signal RESET for a booting operation of the storage device 520 to the storage device 520 in step 930. In the low voltage detection (LVD) status, it is detected that the power source voltage is supplied at a voltage level lower than a predetermined voltage level. According to the embodiment of the present disclosure, when the storage device 520 is an embedded Multi-Media Card (eMMC), the host 510 may transfer a command CMD for reset, which may be a '0' or a command CMD for initialization, which may be '1', to the storage device 520 as a reset signal RESET.

In response to the reception of the reset signal RESET, the storage device 520 may perform a booting operation and wait until the power source voltage reaches a normal voltage level. When the power source voltage reaches a normal voltage level, the storage device 520 may transfer a response signal to the status request signal that is received from the host 510. Herein, since the power source voltage is detected to be at a normal voltage level, the response signal may include an idle state value representing that the protocol processing unit 522 transitions to an idle state.

In steps 920 and 940, the host 510 may decide whether or not the response signal to the status request signal is received and whether or not the received response signal has the idle state value. When the received response signal has the idle state value, the host 510 may decide that the power source voltage of the storage device 520 is at a normal voltage level.

When the received response signal has the idle state value, that is, when power source voltage of the storage device 520 is at a normal voltage level, the host 510 may transfer un-processed task requests to the storage device 520 in step 950. In other words, the host 510 may check out at least one task request to which a response is not received from the storage device 520, which is an un-processed task request, among the task requests that are transferred to the storage device 520. The host 510 may transfer the un-processed task request to the storage device 520 again.

Figure 10:
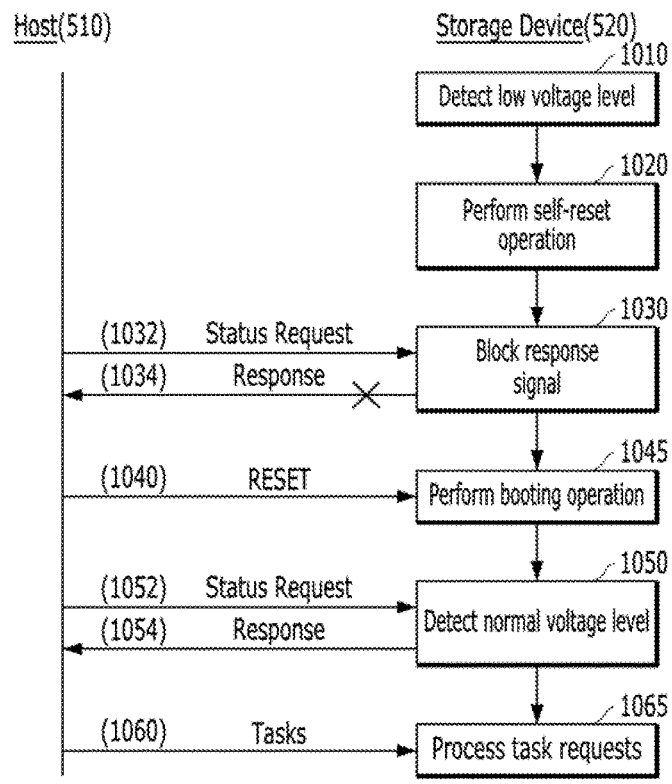
FIG. 10 illustrates an operation process between a storage device and a host of a data processing system in accordance with an embodiment of the present disclosure.

FIG. 10 illustrates an operation process between a storage device and a host of a data processing system in accordance with an embodiment of the present disclosure. The operation process may be performed between the host 510 and the storage device 520 illustrated in FIG. 5.

Referring to FIG. 10, the storage device 520 may detect whether or not the power source voltage is supplied at a voltage lower than a predetermined voltage level in step 1010. According to the embodiment of the present disclosure, the core unit 524 of the storage device 520 may decide that the power source voltage is in the low voltage detection (LVD) status in response to the LVD detection signal that is received from the power management unit 526.

When the low voltage detection (LVD) status is detected, the storage device 520 may then perform a self-reset operation in step 1020 and the core unit 524 of the storage device 520 may reset the protocol processing unit 522.

In step 1030, the storage device 520 may block the transfer of the response signal to the status request signal that is received from the host 510. According to the embodiment of the present disclosure, the protocol processing unit 522 of the storage device 520 may block the transfer of the response signal to the status request signal (1032) that is received from the host 510 in response to the reset of the protocol processing unit 522, which is performed by the core unit 524 in step 1034.

In step 1040, when the response signal to the status request signal is not received until a predetermined time (e.g., several μs) passes, the host 510 may recognize that the storage device 520 is in the low voltage detection (LVD) status and transfer the reset signal RESET for a booting operation of the storage device 520 to the storage device 520. According to the embodiment of the present disclosure, when the storage device 520 is an embedded Multi-Media Card (eMMC), the host 510 may transfer a command CMD for reset, which may be a '0' or a command CMD for initialization, which may be '1', to the storage device 520 as a reset signal RESET.

In step 1045, in response to the reset signal RESET that is received from the host 510, the storage device 520 may perform a booting operation.

In step 1050, the storage device 520 may detect whether the power source voltage is at a normal voltage level after the booting operation. When the power source voltage is detected to be at a normal voltage level, in step 1054, the storage device 520 may transfer a response signal to the status request signal that is received from the host 510 in step 1052. Herein, since the power source voltage is detected to be at a normal voltage level, the response signal may include an idle state value representing that the storage device 520 shifts into an idle state.

In step 1060, as the response signal having the idle state value is received, the host 510 may transfer at least one task request that has not been processed before to the storage device 520.

In step 1065, the storage device 520 may process at least one un-processed task request that is received from the host 510. As the core unit 524 receives and processes the task request which has not been processed before, the core unit 524 may recover the un-processed task request.

Figure 11:
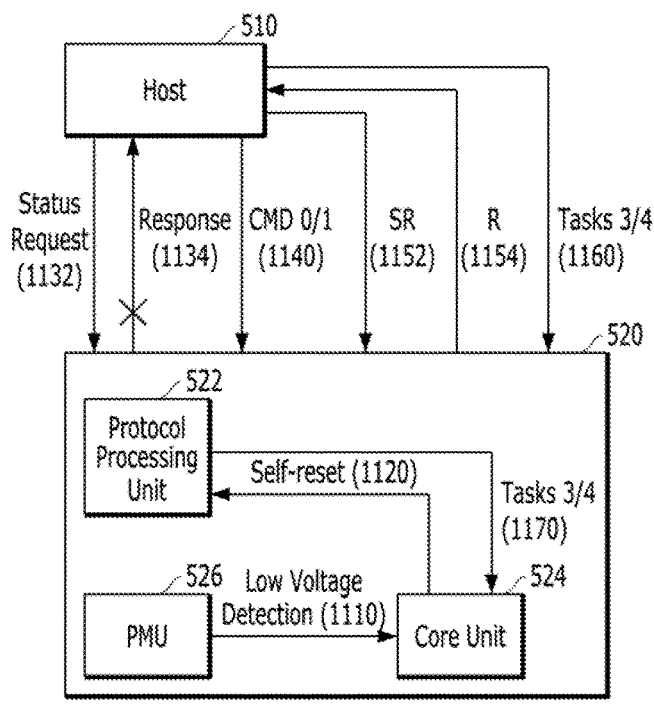
FIG. 11 illustrates an operation example of a data processing system for recovering tasks when a low voltage is detected between storage devices in accordance with an embodiment of the present disclosure.

FIG. 11 illustrates an operation example of a data processing system for recovering tasks when a low voltage is detected between storage devices in accordance with an embodiment of the present disclosure. The operation may be performed between the host 510 and the storage device 520 illustrated in FIG. 5. As shown in FIG. 5, the storage device 520 may include the protocol processing unit 522, the core unit 524, and the power management unit 526.

Referring to FIG. 11, the power management unit (PMU) 526 may detect whether the power source voltage is lower than a particular voltage level (e.g., approximately 3.6V or 3V), that is, whether a power source voltage of a low voltage level (e.g., approximately 1.65V or 1.5V) is supplied or not, and transfer the detection result to the core unit 524 (operation 1110). In accordance with the embodiment of the present disclosure, when a power source voltage of a low voltage level is detected, the power management unit 526 may transfer a signal representing the detection of the power source voltage of the low voltage level to the core unit 524.

The core unit 524 may decide that the core unit 524 is in the low voltage detection (LVD) status in response to the LVD detection signal that is received from the power management unit 526. In the low voltage detection (LVD) status, the core unit 524 may reset the protocol processing unit 522 by performing a self-reset operation (operation 1120). The protocol processing unit 522 may block (operation 1134) the transfer of the response signal to the status request signal that is received from the host 510 (operation 1132) in response to the reset of the protocol processing unit 522, which is performed by the core unit 524.

When the response signal to the status request signal is not received until a predetermined time (e.g., several μs) passes, the host 510 may recognize that the storage device 520 is in the low voltage detection (LVD) status, and transfer the reset signal RESET for a booting operation of the storage device 520 to the storage device 520 (operation 1140). According to the embodiment of the present disclosure, when the storage device 520 is an embedded Multi-Media Card (eMMC), the host 510 may transfer a command CMD for reset, which may be a '0' or a command CMD for initialization, which may be '1', to the storage device 520 as a reset signal RESET.

In response to the reception of the reset signal RESET that is transferred from the host 510, the core unit 524 may perform a booting operation and wait until the power source voltage reaches a normal voltage level.

When the power source voltage is detected to be at a normal voltage level, the protocol processing unit 522 may transfer a response signal R (operation 1154) to the status request signal SR that is received from the host 510 (operation 1152). Herein, since the power source voltage is detected to be at a normal voltage level, the response signal may include an idle state value representing that the storage device 520 shifts into an idle state.

The host 510 may transfer (operation 1160) at least one task request (e.g., Task 3 and Task 4) which has not been processed before to the storage device 520 in response to the reception of the response signal having the idle status value.

The core unit 524 may receive the at least one un-processed task request from the host 510 through the protocol processing unit 522, and process the received task request (operation 1170). As described above, the core unit 524 may recover the un-processed task request by receiving and processing the un-processed task request.

According to the embodiment of the present disclosure, which is described above, the storage device 520 in the low voltage detection (LVD) status may block the transfer of the response signal to the status request signal that is periodically received from the host 510. Since the transfer of the response signal from the storage device 520 is blocked, the host 510 may perform a recovery operation for recovering the un-processed task requests by recognizing the low voltage detection (LVD) status of the storage device 520 and transferring the task requests that are not processed normally due to the low voltage detection (LVD) status to the storage device 520 again. This embodiment does not correspond to a device proactive recovery operation by the storage device 520 but to a device passive recovery operation. The device passive recovery operation makes it possible to induce a quick reset by rapidly blocking the response signal in the low voltage detection (LVD) status of the storage device 520, and perform a compact recovery operation that is led by the host 510. Hence, according to the embodiment of the present invention, the task recovery operation may be performed more simply and more safely at a low cost.

Hereinafter, a data processing system and electronic equipment provided with the memory system 110 including the memory device 150 and the controller 130 described with reference to FIGS. 1 to 11 in accordance with an embodiment will be described in more detail with reference to FIGS. 12 to 20.

FIGS. 12 to 20 are diagrams schematically illustrating application examples of the data processing system of FIG. 1 in accordance with various embodiments of the present disclosure.

Figure 12:
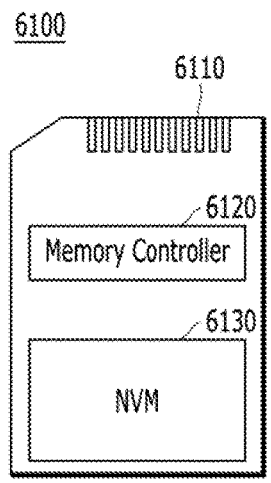
FIGS. 12 to 20 are diagrams schematically illustrating application examples of the data processing system shown in FIG. 1 in accordance with various embodiments of the present disclosure.

FIG. 12 is a diagram schematically illustrating another example of the data processing system including the memory system in accordance with an embodiment of the present disclosure. FIG. 12 schematically illustrates a memory card system to which the memory system in accordance with an embodiment is applied.

Referring to FIG. 12, the memory card system 6100 may include a connector 6110, a memory controller 6120, and a memory device 6130.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a random access memory (RAM), a processing unit, a host interface, a memory interface and an error correction unit. The memory controller 6120 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), wireless fidelity (WI-FI) and Bluetooth. The memory system and the data processing system in accordance with an embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may construct a solid state drive (SSD) by being integrated into a single semiconductor device. Also, the memory controller 6120 and the memory device 6130 may construct a memory card such as a PC card (e.g., Personal Computer Memory Card International Association (PCM-CIA)), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 13:
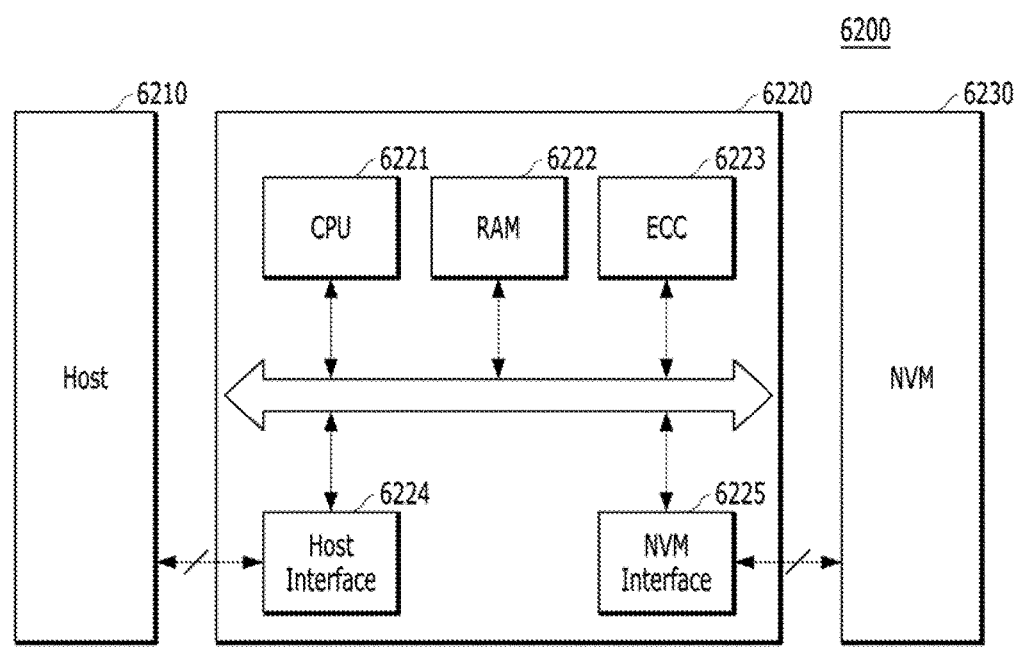

FIG. 13 is a diagram schematically illustrating another example of the data processing system including the memory system in accordance with an embodiment of the present disclosure.

Referring to FIG. 13, the data processing system 6200 may include a memory device 6230 having one or more nonvolatile memories (NVMs) and a memory controller 6220 for controlling the memory device 6230. The data processing system 6200 illustrated in FIG. 13 may serve as a storage medium such as a memory card (e.g., CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include a central processing unit (CPU) 6221, a random access memory (RAM) as a buffer memory 6222, an error correction code (ECC) circuit 6223, a host interface 6224 and an NVM interface as a memory interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an error correction code for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using any suitable method including a coded modulation such as a low density parity check (LDPC) code, a Bose-Chaudhuri-Hocquenghem (BCH) code, a turbo code, Reed-Solomon (RS) code, a convolution code, a recursive systematic code (RSC), a trellis-coded modulation (TCM) or a Block coded modulation (BCM).

The memory controller 6220 may transmit/receive data to/from the host 6210 through the host interface 6224, and transmit/receive data to/from the memory device 6230 through the NVM interface 6225. The host interface 6224 may be connected to the host 6210 through at least one of various interface protocols such as a parallel advanced technology attachment (PATA) bus, a serial advanced technology attachment (SATA) bus, a small computer system interface (SCSI), a universal serial bus (USB), a peripheral component interconnection express (PCIe) or a NAND interface. The memory controller 6220 may have a wireless communication function with a mobile communication protocol such as wireless fidelity (WI-FI) or long term evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with an embodiment may be applied to wired/wireless electronic devices or particularly a mobile electronic device.

Figure 14:
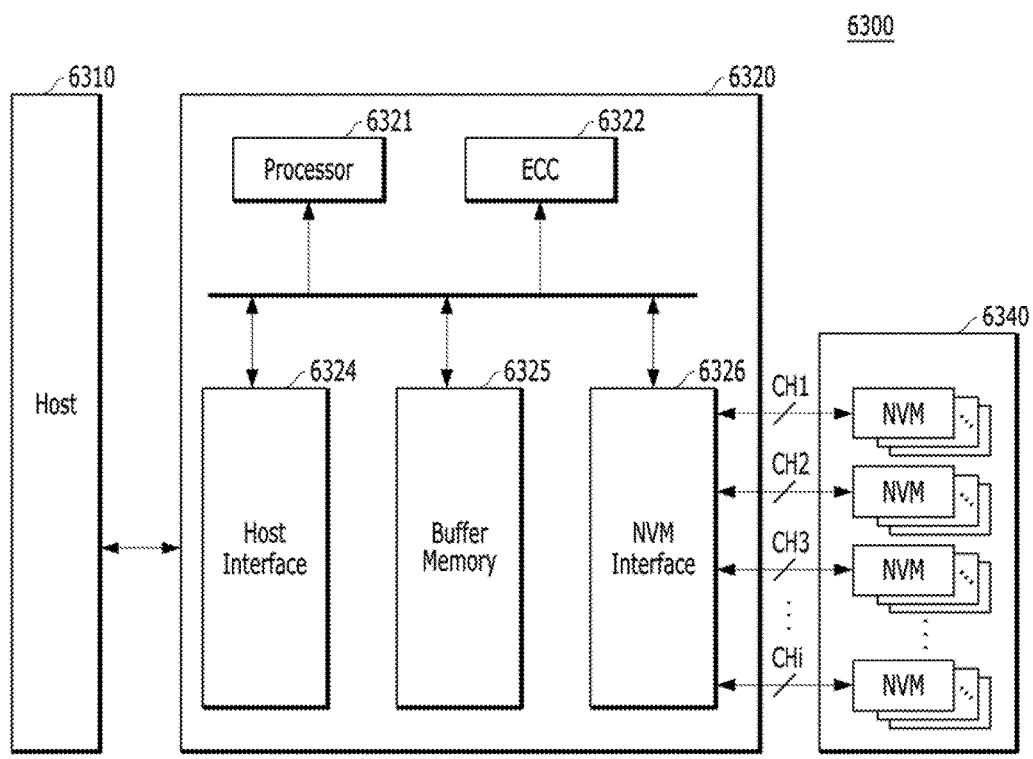

FIG. 14 is a diagram schematically illustrating another example of the data processing system including the memory system in accordance with an embodiment of the present disclosure. FIG. 14 schematically illustrates a solid state drive (SSD) 6300 to which the memory system in accordance with an embodiment is applied.

Referring to FIG. 14, the SSD 6300 may include a controller 6320 and a memory device 6340 including a plurality of nonvolatile memories. The controller 6320 may correspond to the controller 130 in the memory system 110 of FIGS. 1 and 5, and the memory device 6340 may correspond to the memory device 150 in the memory system of FIG. 1.

More specifically, the controller 6320 may be connected to the memory device 6340 through a plurality of channels CH1 to CHi. The controller 6320 may include a processor 6321, a buffer memory 6325, an error correction code (ECC) circuit 6322, a host interface 6324 and a nonvolatile memory interface as a memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as a dynamic random access memory (DRAM), a synchronous dynamic random access memory (SDRAM), a double data rate (DDR) SDRAM, a low power double data rate (LPDDR) SDRAM and graphic random access memory (GRAM) or nonvolatile memories such as a ferroelectric random access memory (FRAM), a resistive random access memory (ReRAM), a spin-transfer torque magnetic random access memory (STT-MRAM) and a phase change random access memory (PRAM). For convenience of description, FIG. 14 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, a redundant array of independent disks (RAID) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 15:
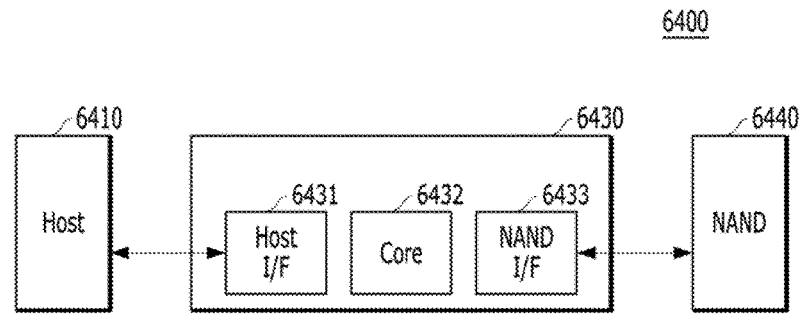

FIG. 15 is a diagram schematically illustrating another example of the data processing system including the memory system in accordance with an embodiment of the present disclosure. FIG. 15 schematically illustrates an embedded Multi-Media Card (eMMC) to which the memory system in accordance with an embodiment is applied.

Referring to FIG. 15, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface such as an MMC interface as described with reference to FIG. 1. Furthermore, the host interface 6431 may serve as a serial interface such as an ultra-high speed class 1 (UHS-I)/UHS class 2 (UHS-II) and a universal flash storage (UFS) interface.

FIGS. 16 to 19 are diagrams schematically illustrating other examples of the data processing system including the memory system in accordance with embodiments of the present disclosure. FIGS. 16 to 19 schematically illustrate universal flash storage (UFS) systems to which the memory system in accordance with an embodiment is applied.

Referring to FIGS. 16 to 19, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired and/or wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 13 to 15, and the UFS cards 6530, 6630, 6730 and 6830 may be embodied in the form of the memory card system 6100 described with reference to FIG. 12.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI Unified Protocol (UniPro) in Mobile Industry Processor Interface (MIPI). Furthermore, the UFS devices 6520, 6620, 6720 and 6820 and the UFS cards 6530, 6630, 6730 and 6830 may communicate with each other through various protocols other than the UFS protocol, for example, USB flash drives (UFDs), multimedia card (MMC), secure digital (SD), mini-SD, and micro-SD.

Figure 16:
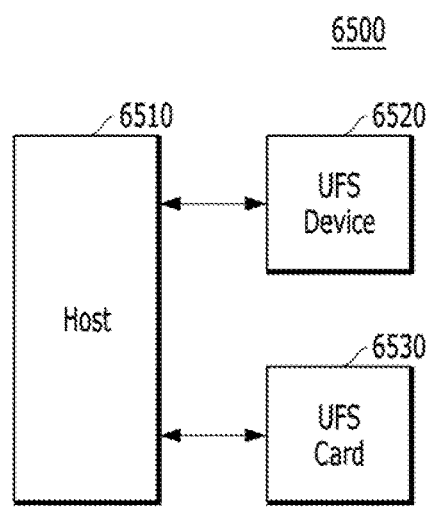

In the UFS system 6500 illustrated in FIG. 16, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In an embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 17:
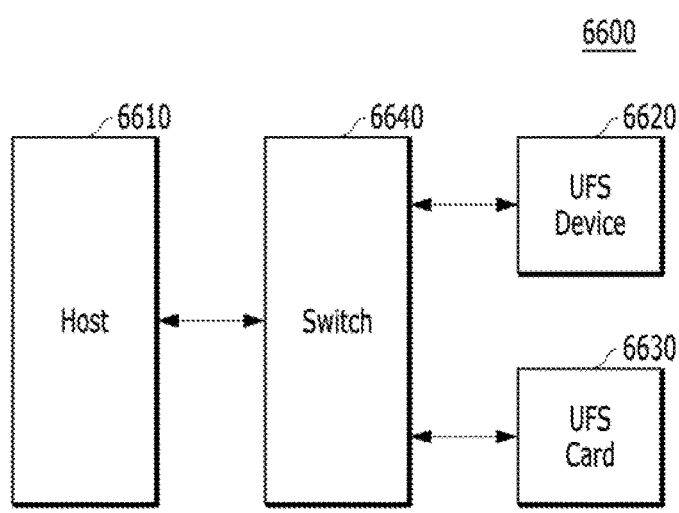

In the UFS system 6600 illustrated in FIG. 17, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In an embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 18:
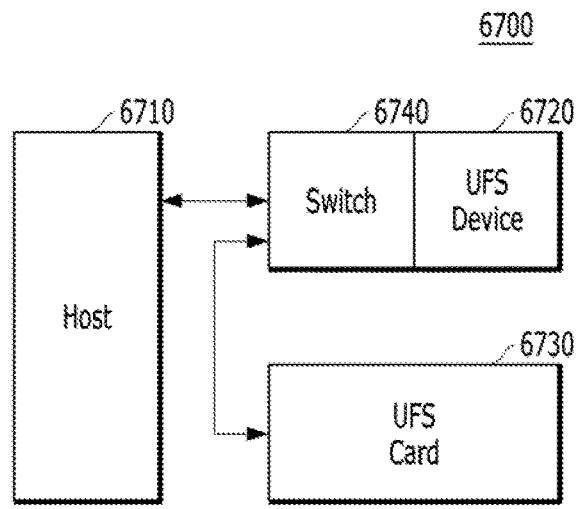

In the UFS system 6700 illustrated in FIG. 18, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In an embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 19:
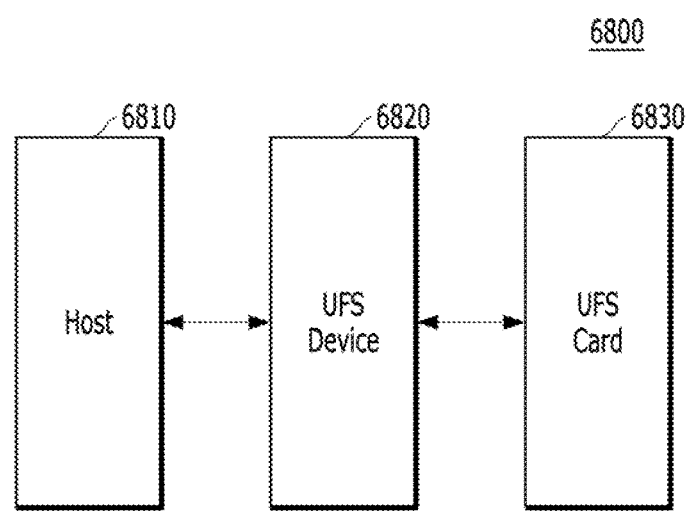

In the UFS system 6800 illustrated in FIG. 19, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target identifier (ID) switching operation. At this time, the host 6810 and the UFS card 6830 may communicate with each other through target ID switching between the M-PHY and UniPro modules of the UFS device 6820. In an embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 20:
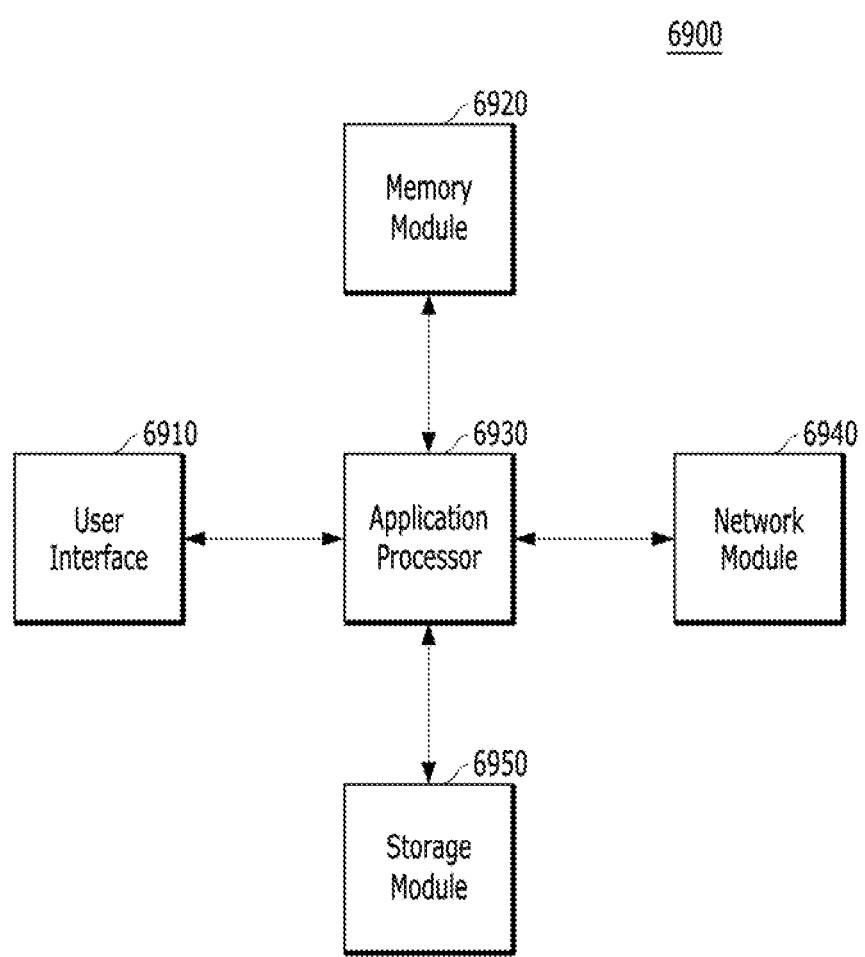

FIG. 20 is a diagram schematically illustrating another example of the data processing system including the memory system in accordance with an embodiment of the present disclosure. FIG. 20 is a diagram schematically illustrating a user system to which the memory system in accordance with an embodiment is applied.

Referring to FIG. 20, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDARM, an LPDDR2 SDRAM and an LPDDR3 SDRAM or a nonvolatile RAM such as a phase change random access memory (PRAM), a resistive random access memory (ReRAM), a magnetic random access memory (MRAM) and a ferroelectric random access memory (FRAM). For example, the application processor 6930 and the memory module 6920 may be packaged and mounted, based on a package-on-package (POP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (WIMAX), wireless local area network (WLAN), ultra-wideband (UWB), Bluetooth, wireless display (WI-DI), thereby communicating with wired and/or wireless electronic devices or particularly mobile electronic devices. Therefore, the memory system and the data processing system, in accordance with an embodiment of the present invention, can be applied to wired and/or wireless electronic devices. The network module 6940 may be included in the application processor 6930.

The storage module 6950 may store data, for example, data provided from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 14 to 19.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, a light emitting diode (LED), a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired and/or wireless communication with an external device. The user interface 6910 may display data processed by the processor 6930 on a display/touch module of the mobile electronic device, or support a function of receiving data from the touch panel.

While the present invention has been described with respect to specific embodiments, it will be apparent to those skilled in the art that various other embodiments, changes and modifications thereof may be made without departing from the spirit and scope of the invention as defined in the following claims.

What is claimed is:

1. A storage device, comprising:
a protocol processing unit configured to communicate with a host based on a predetermined protocol, and transfer a response signal to at least one status request signal that is entered from the host;
a power management unit configured to supply a power source voltage, and output a detection signal which represents a low voltage detection status where the power source voltage has a voltage level lower than a predetermined voltage level; and
a core unit configured to change an operation state of the protocol processing unit to suppress an operation of the protocol processing unit which transfers the response signal corresponding to the at least on status request signal, in response to the detection signal, and process at least one task request which is entered from the protocol processing unit after the suppression,
wherein the protocol processing unit transitions to a blocking state where the operation for transferring the response signal is not performed in the low voltage detection status, transitions to an initialization state in response to the reset signal that is received from the host after a predetermined time passes in the blocking state, transitions to a busy state where a booting operation is performed in response to the reset signal that is received from the host in the initialization state, and when the power source voltage is detected to be at a normal voltage level in the busy state, transitions to an idle state.

2. The storage device of claim 1, wherein the core unit resets the protocol processing unit in response to the detection signal to suppress the operation for transferring the response signal.

3. The storage device of claim 1, wherein the core unit performs a booting operation in response to a reset signal that is received from the host, after a predetermined time passes from a moment when the operation for transferring the response signal at the protocol processing unit is suppressed.

4. The storage device of claim 3, wherein when the power source voltage is detected to be at a normal level after the booting operation is performed, the core unit releases the suppression on the protocol processing unit.

5. The storage device of claim 4, wherein the core unit receives the at least one task request through the protocol processing unit after the suppression is released and processes the received task request.

6. The storage device of claim 1, wherein the protocol processing unit transfers the response signal representing the idle state to the host as a response signal to the status request signal that is received from the host in the idle state, and receives the at least one task request from the host after the transfer of the response signal.

7. A data processing system, comprising:
a host; and
a storage device configured to change an operation state of a protocol processing unit to suppress a first operation for transferring a response signal to at least one status request signal that is entered from the host in a low voltage detection status, receive at least one task request that is entered from the host after the suppression, and process a second operation corresponding to the at least one task request,
wherein the protocol processing unit transitions to a blocking state where the first operation for transferring the response signal is not performed in the low voltage detection status, transitions to an initialization state in response to the reset signal that is received from the host after a predetermined time passes in the blocking state, transitions to a busy state where a booting operation is performed in response to the reset signal that is received from the host in the initialization state, when the power source voltage is detected to be at a normal voltage level in the busy state, transitions to an idle state, transfers the response signal representing the idle state to the host as a response signal to the status request signal that is received from the host in the idle state, and receives the at least one task request from the host after the transfer of the response signal.

8. The data processing system of claim 7, wherein the storage device includes:
a protocol processing unit configured to communicate with the host based on a predetermined protocol, and transfer a response signal to the at least one status request signal that is received from the host;
a power management unit configured to supply a power source voltage, and output a detection signal which represents a low voltage detection status where the power source voltage has a voltage level lower than a predetermined voltage level; and
a core unit configured to suppress the transfer of the response signal by the protocol processing unit in response to the detection signal, and process at least one task request which is received from the host through the protocol processing unit after the suppression.

9. The data processing system of claim 7, wherein the core unit suppresses the transfer of the response signal by the protocol processing unit by resetting the protocol processing unit in response to the detection signal.

10. The data processing system of claim 7, wherein the core unit performs a booting operation in response to a reset signal that is received from the host, after a predetermined time passes from a moment when the transfer of the response signal by the protocol processing unit is suppressed.

11. The data processing system of claim 10, wherein when the power source voltage is detected to be at a normal level after the booting operation is performed, the core unit releases the suppression on the protocol processing unit.

12. The data processing system of claim 11, wherein the core unit receives the at least one task request through the protocol processing unit after the suppression is released and processes the received task request.

13. A method for operating a storage device, comprising:
receiving at least one status request signal that is entered from a host;
transferring a response signal corresponding to the at least one status request signal;
changing an operation state of a protocol processing unit to suppress a first operation for transferring the response signal in a low voltage detection status where a power source voltage has a voltage level lower than a predetermined voltage level;
receiving at least one task request that is entered from the host after the suppression; and
processing a second operation corresponding to the at least one task request,
wherein the changing the operation state includes:
transitioning to a blocking state where the first operation for transferring the response signal is not performed in the low voltage detection status;
transitioning to an initialization state in response to the reset signal that is received from the host after a predetermined time passes in the blocking state;
transitioning to a busy state where a booting operation is performed in response to the reset signal that is received from the host in the initialization state;
when the power source voltage is detected to be at a normal voltage level in the busy state, transitioning into an idle state;
transferring the response signal representing the idle state to the host as a response signal to a status request signal that is received from the host in the idle state; and
receiving the at least one task request from the host after the transfer of the response signal.

14. The method of claim 13, wherein the suppressing the first operation for transferring the response signal in the low voltage detection status includes:
resetting a protocol processing unit which transfers the response signal to the host, in the low voltage detection status to suppress the first operation for transferring the response signal.

15. The method of claim 13, further comprising:
performing a booting operation in response to a reset signal that is received from the host, after a predetermined time passes from a moment when the transfer of the response signal is suppressed.

16. The method of claim 15, further comprising:
releasing the suppression, when the power source voltage is detected to be at a normal voltage level, after the booting operation is performed.

17. The method of claim 16, wherein the processing of the at least one task request that is received from the host after the suppression includes:
receiving the at least one task request from the host after the suppression is released and processing the received task request.

* * * * *